(12) United States Patent
Rath et al.

(10) Patent No.: US 11,991,361 B2
(45) Date of Patent: May 21, 2024

(54) METHOD AND DEVICE FOR PICTURE ENCODING AND DECODING USING POSITION DEPENDENT INTRA PREDICTION COMBINATION

(71) Applicant: InterDigital CE Patent Holdings, SAS, Paris (FR)

(72) Inventors: Gagan Rath, Rennes (FR); Fabien Racape, San Francisco, CA (US); Fabrice Urban, Thorigne Fouillard (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 109 days.

(21) Appl. No.: 17/619,047

(22) PCT Filed: Jun. 15, 2020

(86) PCT No.: PCT/EP2020/066522
§ 371 (c)(1),
(2) Date: Dec. 14, 2021

(87) PCT Pub. No.: WO2020/254264
PCT Pub. Date: Dec. 24, 2020

(65) Prior Publication Data
US 2022/0303541 A1 Sep. 22, 2022

(30) Foreign Application Priority Data
Jun. 20, 2019 (EP) ..................................... 19305798

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/159* (2014.11); *H04N 19/176* (2014.11)

(58) Field of Classification Search
CPC .. H04N 19/132; H04N 19/105; H04N 19/159; H04N 19/176; H04N 19/117; H04N 19/593; H04N 19/70; H04N 19/11
(Continued)

(56) References Cited

U.S. PATENT DOCUMENTS 10,652,537 B1 * 5/2020 Sun .................. H04N 19/12
2018/0098064 A1 * 4/2018 Seregin .............. H04N 19/159
(Continued)

FOREIGN PATENT DOCUMENTS

WO WO 2020111982 A1 6/2020

OTHER PUBLICATIONS

Racape et al., "CE3-Related: Wide-Angle Intra Prediction for Non-Square Blocks", Joint Video Experts Team (JVET) of ITU-T SG 16 WP 3 and ISO/IEC JTC 1/SC 29/WG 11, Document: JVET-K0500_r4, 11th Meeting, Ljubljana, Slovenia, Jul. 10, 2018, 13 pages.
(Continued)

*Primary Examiner* — Tung T Vo
(74) *Attorney, Agent, or Firm* — CONDO ROCCIA KOPTIW LLP

(57) ABSTRACT

A video coding system comprises a post-processing stage using position dependent intra prediction combination where a predicted sample is modified based on a weighting between a value of a left or top reference sample and the obtained predicted value for the sample, wherein the left or top reference sample is determined based on the intra prediction angle. This provides better computing efficiency while keeping identical compression performance. Encod-
(Continued)

ing method, decoding method, encoding apparatus and decoding apparatus based on this post-processing stage are proposed.

14 Claims, 11 Drawing Sheets

(51) Int. Cl.
*H04N 19/159* (2014.01)
*H04N 19/176* (2014.01)

(58) Field of Classification Search
USPC .................................................. 375/240.02
See application file for complete search history.

(56) References Cited

U.S. PATENT DOCUMENTS

| 2019/0306513 | A1* | 10/2019 | Van der Auwera .... H04N 19/11 |
| 2020/0007870 | A1* | 1/2020 | Ramasubramonian ...................... H04N 19/176 |
| 2020/0021817 | A1* | 1/2020 | Van der Auwera .. H04N 19/176 |
| 2020/0204826 | A1* | 6/2020 | Rath ................... H04N 19/176 |
| 2020/0275095 | A1* | 8/2020 | Bokov ................ H04N 19/182 |

OTHER PUBLICATIONS

Anonymous, "Information Technology—Generic Coding of Moving Pictures and Associated Audio Information: Video", International Organization for Standardization (ISO) and the International Electrotechnical Commission (IEC), International Standard 13818-2, Recommendation ITU-T H.262, Document ISO 13818-2: 1995 (E), 1995, 255 pages.
Bross et al: "Versatile video coding (draft 3)", Joint Video Experts Team (JVET) of ITU-T SG 16 WP 3 and ISO/IEC JTC 1/SC 29/WG 11, Document: JVET-L1001-v3, 12th Meeting, Macao, China, Oct. 3, 2018, 177 pages.
Anonymous, "Information technology—Generic coding of moving pictures and associated audio information: Systems", International Telecommunication Union, ITU-T Telecommunication Standardization Sector of ITU, Series H: Audiovisual and Multimedia Systems—Infrastructure of audiovisual services—Transmission multiplexing and synchronization, Recommendation ITU-T H.222.0, Jun. 2012, 228 pages.
Zhao et al, "EE1 related: Simplification and Extension of PDPC", Joint Video Exploration Team (JVET) of ITU-T SG 16 WP 3 and ISO/IEC JTC 1/SC 29/WG 11, Document: JVET-H0057-r1, 8th Meeting, Macao, China, Oct. 18, 2017, 3 pages.
Drugeon et al., "CE3-related: disabling PDPC based on availability of reference samples", Joint Video Experts Team (JVET) of ITU-T SG 16 WP 3 and ISO/IEC JTC 1/SC 29/WG 11, Document: JVET-M0358, 13th Meeting: Marrakech, Morocco, Jan. 9, 2019, 7 pages.
Anonymous, High Efficiency Video Coding, Series H: Audiovisual and Multimedia Systems, Infrastructure of audiovisual services—Coding of moving video, Telecommunication Standardization Sector of ITU, Recommendation ITU-T H.265, Oct. 2014, 540 pages.
Rath et al., "CE3-related: Simplifications of PDPC for diagonal and adjacent diagonal directions", Joint Video Experts Team (JVET) of ITU-T SG 16 WP 3 and ISO/IEC JTC 1/SC 29/WG 11, Document: JVET-O0229, 15th Meeting: Gothenburg, Sweden, Jul. 3, 2019, 7 pages.
Van Der Auwera et al., "CE3: Simplified PDPC (Test 2.4.1)", Joint Video Experts Team (JVET) of ITU-T SG 16 WP3 and ISO/IEC JTC 1/SC 29/WG 11, Document: JVET-K0063-v2, 11th Meeting: Ljubljana, Slovenia, Jul. 10, 2018, 6 pages.
Van Der Auwera, et al., "Description of Core Experiment 3: Intra Prediction and Mode Coding", Joint Video Experts Team (JVET) of ITU-T SG 16 WP 3 and ISO/IEC JTC 1/SC 29/WG 11, Document: JVET-K1023-v3, 11th Meeting, Ljubljana, Slovenia, Jul. 10, 2018, 35 pages.
Lee et al., "CE3-related: Simplification of PDPC", Joint Video Experts Team (JVET) of ITU-T SG 16 WP 3 and ISO/IEC JTC 1/SC 29/WG 11, Document: JVET-L0152-v3, 12th Meeting, Macao, China, Oct. 3, 2018, 7 pages.

* cited by examiner

Figure 11

|  | Over VTM-5.0 | | | | |
|---|---|---|---|---|---|
|  | Y | U | V | EncT | DecT |
| Class A1 | 0.00% | 0.00% | 0.00% | 101% | 101% |
| Class A2 | 0.00% | 0.00% | 0.00% | 98% | 94% |
| Class B | 0.00% | 0.00% | 0.00% | 101% | 99% |
| Class C | 0.00% | 0.00% | 0.00% | 96% | 95% |
| Class E | 0.00% | 0.00% | 0.00% | 100% | 99% |
| Overall | 0.00% | 0.00% | 0.00% | 99% | 98% |
| Class D | 0.00% | 0.00% | 0.00% | 99% | 94% |
| Class F (optional) | 0.00% | 0.00% | 0.00% | 99% | 95% |

Figure 12

|  | Over VTM-5.0 | | | | |
|---|---|---|---|---|---|
|  | Y | U | V | EncT | DecT |
| Class A1 | -0.01% | 0.03% | -0.02% | 98% | 96% |
| Class A2 | 0.00% | -0.05% | -0.03% | 96% | 95% |
| Class B | 0.01% | -0.04% | 0.00% | 100% | 98% |
| Class C | 0.01% | -0.04% | 0.00% | 95% | 95% |
| Class E | 0.00% | -0.11% | -0.02% | 102% | 103% |
| Overall | 0.00% | -0.04% | -0.01% | 98% | 97% |
| Class D | 0.01% | 0.18% | -0.04% | 98% | 91% |
| Class F (optional) | 0.01% | 0.01% | 0.05% | 99% | 96% |

METHOD AND DEVICE FOR PICTURE ENCODING AND DECODING USING POSITION DEPENDENT INTRA PREDICTION COMBINATION

CROSS REFERENCE TO RELATED APPLICATIONS

This application is a U.S. National Stage Application under 35 U.S.C. 371 of International Patent Application No. PCT/EP2020/066522, filed Jun. 15, 2020, which is incorporated herein by reference in its entirety.

This application claims the benefit of European Patent Application No. 19305798, filed Jun. 20, 2019, which is incorporated herein by reference in its entirety.

TECHNICAL FIELD

At least one of the present embodiments generally relates to a video coding system, and more particularly a post-processing stage for position dependent intra prediction combination.

BACKGROUND ART

To achieve high compression efficiency, image and video coding schemes usually employ prediction and transform to leverage spatial and temporal redundancy in the video content. Generally, intra or inter prediction is used to exploit the intra or inter frame correlation, then the differences between the original image block and the predicted image block, often denoted as prediction errors or prediction residuals, are transformed, quantized and entropy coded. During encoding the original image block is usually partitioned/split into sub-blocks possibly using quad-tree partitioning for example. To reconstruct the video, the compressed data is decoded by inverse processes corresponding to the prediction, transform, quantization and entropy coding.

SUMMARY

A video coding system comprises a post-processing stage for position dependent intra prediction combination where a predicted sample is modified based on a weighting between a value of a left or top reference sample and the obtained predicted value for the sample, wherein the left or top reference sample is determined based on the intra prediction angle. This provides better computing efficiency while keeping identical compression performance. Encoding method, decoding method, encoding apparatus and decoding apparatus based on this post-processing stage are proposed.

According to a first aspect of at least one embodiment, a method for determining a value of a sample of a block of an image, the value being intra predicted according to a value representative of an intra prediction angle, comprises obtaining a predicted value for the sample and when the intra prediction angle matches a criteria, determining the value of the sample based on a weighting between a value of a left or top reference sample and the obtained predicted value for the sample, wherein the left or top reference sample is determined based on the intra prediction angle.

According to a second aspect of at least one embodiment, a video encoding method comprises, for each sample of a block of video, performing intra prediction for the sample, modifying the value of the sample according to the first aspect, and encoding the block.

According to a third aspect of at least one embodiment, a video decoding method comprises, for each sample of a block of video, performing intra prediction for the sample and modifying the value of the sample according to the first aspect.

According to a fourth aspect of at least one embodiment, a video encoding apparatus comprises an encoder configured to, for each sample of a block of video, perform intra prediction for the sample, modify the value of the sample according to the first aspect, and encode the block.

According to a fifth aspect of at least one embodiment, a video decoding apparatus comprises a decoder configured to, for each sample of a block of video, perform intra prediction for the sample, and modify the value of the sample according to the first aspect.

One or more of the present embodiments also provide a non-transitory computer readable storage medium having stored thereon instructions for encoding or decoding video data according to at least part of any of the methods described above. One or more embodiments also provide a computer program product including instructions for performing at least part of any of the methods described above.

BRIEF SUMMARY OF THE DRAWINGS

FIG. 11 illustrates the result of an implementation of the first embodiment.

FIG. 12 illustrates the result of an implementation of the second embodiment.

DETAILED DESCRIPTION

Various embodiments relate to a post-processing method for a predicted value of a sample of a block of an image, the value being predicted according to an intra prediction angle, wherein the value of the sample is modified after the prediction so that it is determined based on a weighting of the difference between a value of a left reference sample and the obtained predicted value for the sample, wherein the left reference sample is determined based on the intra prediction angle. Encoding method, decoding method, encoding apparatus, decoding apparatus based on this post-processing method are proposed.

Moreover, the present aspects, although describing principles related to particular drafts of VVC (Versatile Video Coding) or to HEVC (High Efficiency Video Coding) specifications, are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Figure 1A:
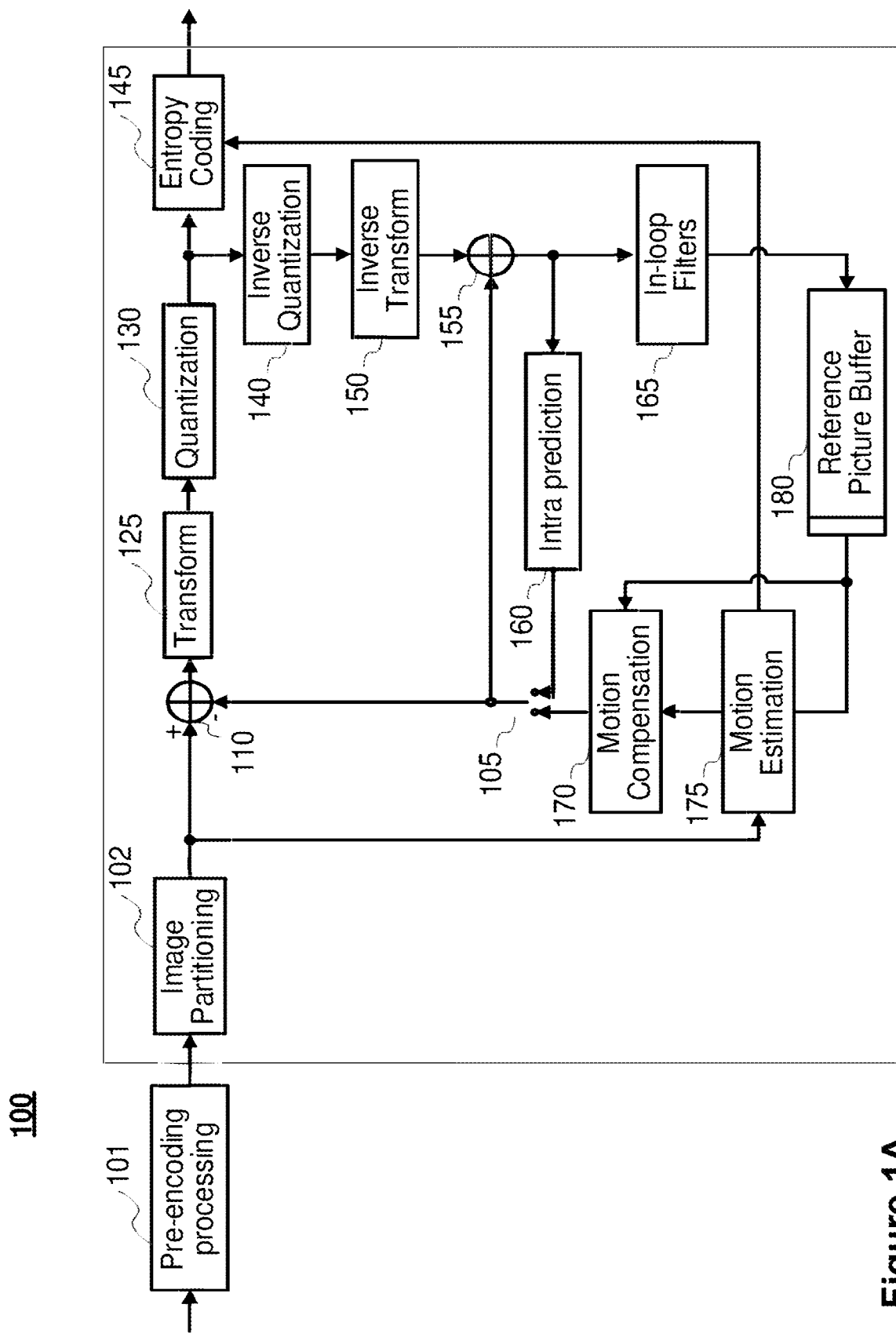
FIG. 1A illustrates a block diagram of a video encoder according to an embodiment.

FIG. 1A illustrates a video encoder 100. Variations of this encoder 100 are contemplated, but the encoder 100 is described below for purposes of clarity without describing all expected variations. Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset), Adaptive Loop-Filter (ALF) filtering to reduce encoding artifacts. The filtered image is stored at a reference picture buffer (180).

Figure 1B:
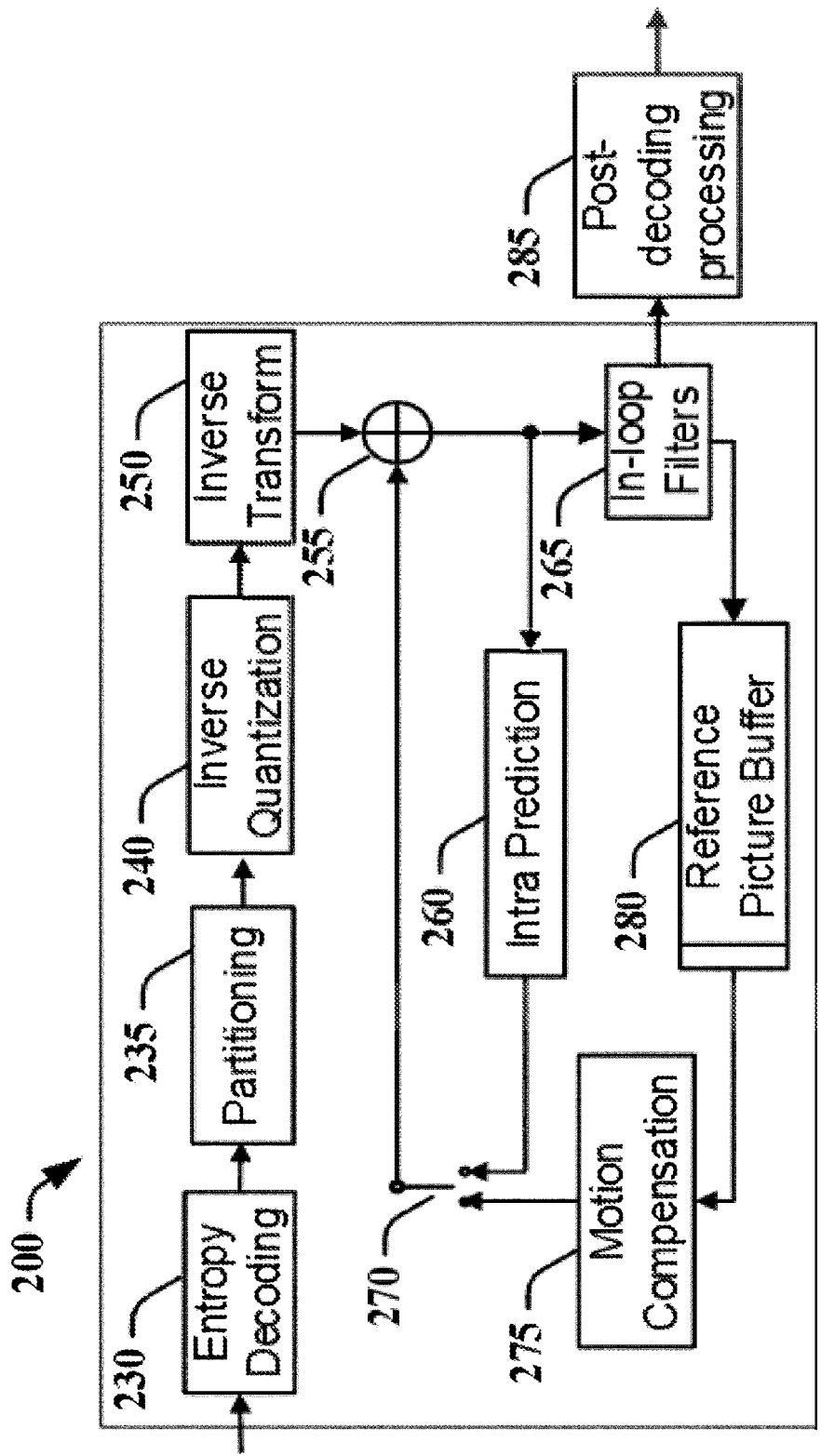
FIG. 1B illustrates a block diagram of a video decoder according to an embodiment.

FIG. 1B illustrates a block diagram of a video decoder 200. In the decoder 200, a bitstream is decoded by the decoder elements as described below. Video decoder 200 generally performs a decoding pass reciprocal to the encoding pass as described in FIG. 18. The encoder 100 also generally performs video decoding as part of encoding video data. In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

Figure 2:
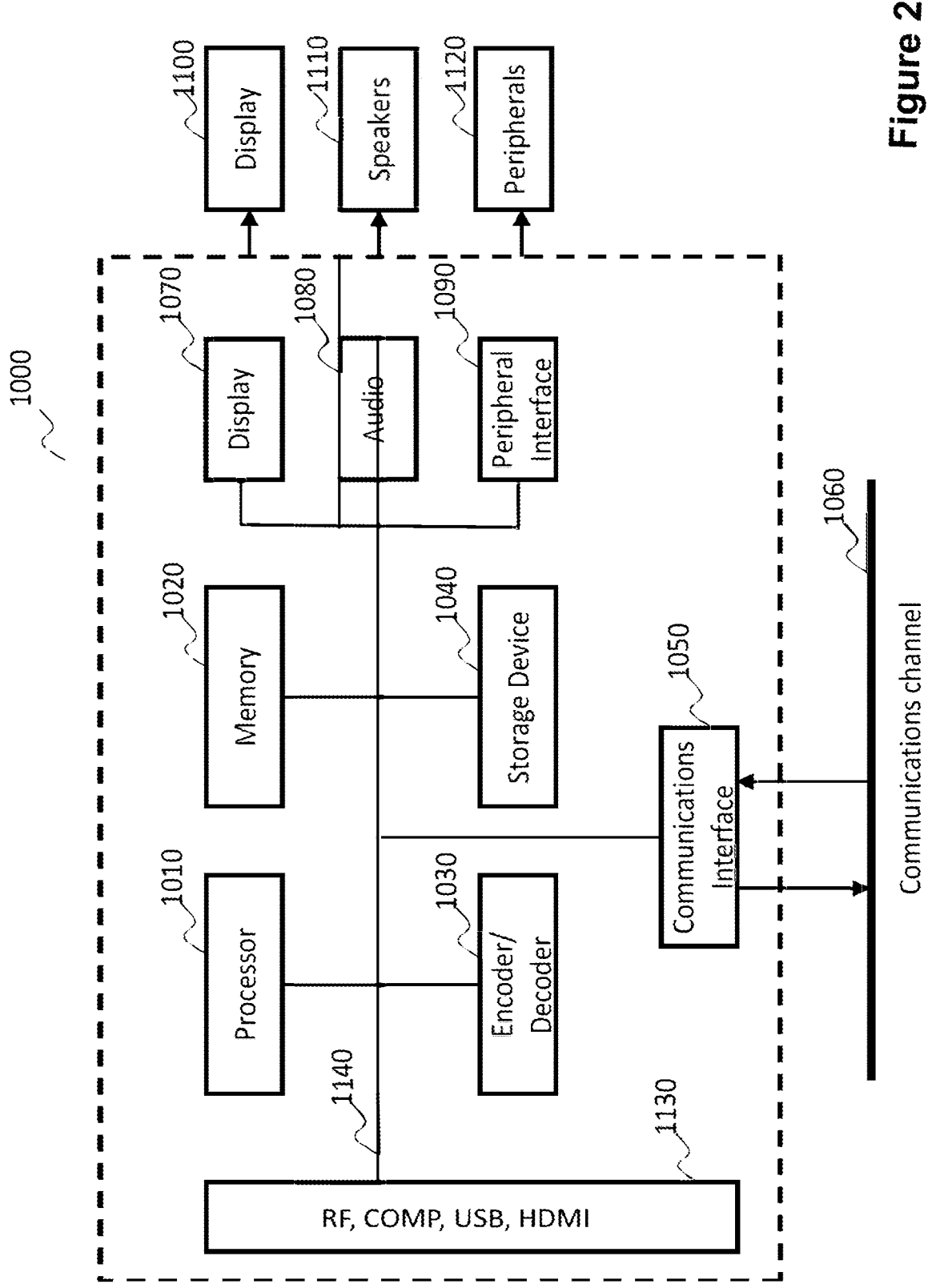
FIG. 2 illustrates a block diagram of an example of a system in which various aspects and embodiments are implemented.

FIG. 2 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 18, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

In Versatile Video Coding (VVC), intra prediction is applied in All-Intra Frames as well as in Intra blocks in Inter frames, where a target block, called a coding unit (CU) is spatially predicted from the causal neighbor blocks in the same frame, i.e., the blocks on the top and top-right, the blocks on the left and left-bottom, and the top-left block. Based on the decoded pixel values in these blocks, the encoder constructs different predictions for the target block and chooses the one that leads to the best rate-distortion (RD) performance. The predictions are tested for 67 prediction modes, which include one PLANAR mode (indexed as mode 0), one DC mode (indexed as mode 1) and 65 angular modes. The angular modes may include only the regular angular prediction modes from mode 2 to mode 66, or also wide angular modes defined beyond the regular angle range from 45 degrees to −135 degrees, for rectangular blocks.

Depending on the prediction mode, the predicted samples may further undergo a post-processing stage such as Position Dependent intra Prediction Combination (PDPC). PDPC aims at smoothing out the discontinuity at the block boundary for certain prediction modes to improve the prediction for a target block. The DC and PLANAR prediction modes, as well as several angular prediction modes such as strictly vertical (mode 50), strictly horizontal (mode 18), the diagonal modes 2 and VDIA_IDX (mode 66), and all other positive angular modes (including the wide angular modes) may result in prediction values at one side of the target block which are much different from the reference samples on the adjacent reference array. Without any kind of post-filtering, the subsequent residual signal would give rise to blocking artifacts, especially at higher QP values. The aim of PDPC is to prevent these blocking artifacts by smoothing out the prediction at the target block boundary in a graceful manner so that intensity change at the target block boundary is rather gradual. However, the PDPC achieves this at a significant complexity. The predicted samples are combined with reference samples from the top and left reference arrays as a weighted average, which involves multiplications and clipping.

For a given target block to be intra predicted, the encoder, or the decoder, first constructs two reference arrays (one on the top and the other on the left). The reference samples are taken from the decoded samples in top, top right, left, left bottom and top left decoded blocks. If some of the samples on top or left are not available, because of the corresponding CUs not being in the same slice, or the current CU being at a frame boundary, etc., then a method called reference sample substitution is performed, where the missing samples are copied from the available samples in a clock-wise direction. Then, depending on the current CU size and the prediction mode, the reference samples are filtered using a specified filter.

For the sake of generality, we will assume a rectangular target block with width W pixels and height H pixels. We will represent the reference arrays on the top and the left as refMain and refSide, respectively. The array refMain has 2*W+1 pixels and they are indexed as refMain[0] to refMain[2W] where refMain[0] corresponds to the top-left reference pixel. Similarly, the array refSide has 2*H+1 pixels and they are indexed as refSide[0] to refSide[2H] where refSide[0] again corresponds to the top-left reference pixel. For the special case of a square block with each side having N pixels, both the reference arrays will have 2N +1 pixels. The horizontal prediction modes (i.e. the modes with indices less than the diagonal mode DIA_IDX, or mode 34) can be implemented by swapping the top and the left reference arrays (Also, the height and the width of the target block). This is possible thanks to the symmetry of the vertical (horizontal) modes about the strictly vertical (horizontal) direction. Throughout this document, we will assume that, for horizontal prediction modes, the refMain and the refSide denote the top and the left reference arrays after they have been swapped. Furthermore, since PDPC is applied only to some positive vertical and positive horizontal directions (except the non-angular cases of PLANAR and DC modes, and the strictly vertical and strictly horizontal modes), we will limit our discussion to only positive prediction directions in this disclosure.

For any target pixel, the reference sample on refMain will be referred to as its predictor. For a given angular prediction mode, the predictor samples on refMain are copied along the corresponding direction inside the target PU. Some predictor samples may have integral locations, in which case they match with the corresponding reference samples; the location of other predictors will have fractional parts indicating that their locations will fall between two reference samples. In the latter case, the predictor samples are interpolated using either a 4-tap cubic or a 4-tap Gaussian filter for the LUMA component, and are linearly interpolated for the CHROMA component.

Mode 2 corresponds to the prediction direction from bottom-left towards top-right in 45 degrees angle whereas mode 66 (also called mode VDIA_IDX) corresponds to the opposite direction. For both these modes, all target pixels in the current block have their predictors at integral positions on refMain. That is, each predicting sample always coincides with a unique reference sample, thanks to the 45 degrees angle. For each target pixel, PDPC finds two reference pixels, one on each reference array, along the prediction direction, and then combines their values with the prediction value.

Figure 3A:
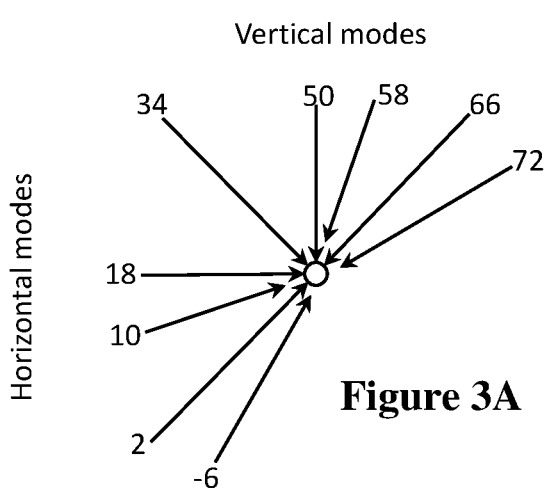
FIGS. 3A and 3B illustrate the notation related to the angular intra prediction.
Figure 3B:
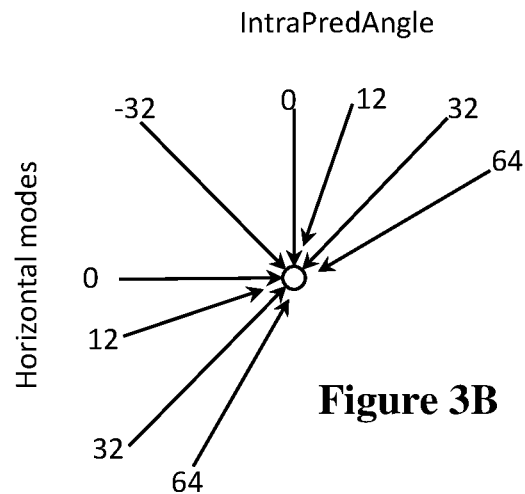

FIGS. 3A and 3B illustrate the notation related to the angular intra prediction. FIG. 3A shows the mode numbering while FIG. 3B shows the corresponding intraPredAngle values.

Figure 4:
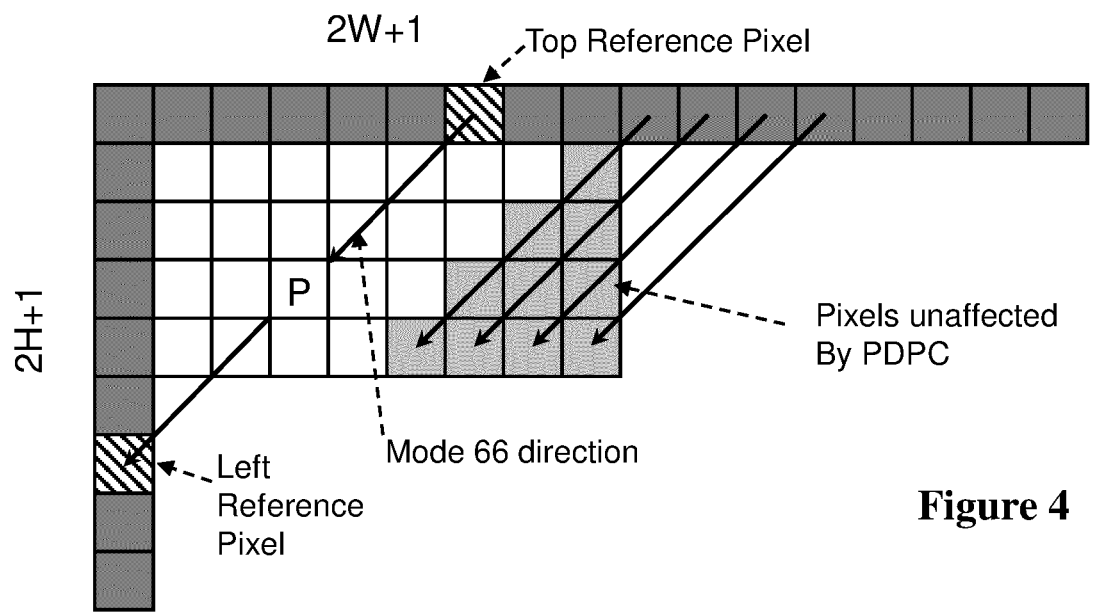
FIG. 4 illustrates Position Dependent intra Prediction Combination for bottom-left mode (mode 66).

FIG. 4 illustrates Position Dependent intra Prediction Combination for bottom-left mode (mode 66). The top reference sample and the left reference samples are located on diagonally opposite directions. Target pixels for which the left reference samples are unavailable are not treated with PDPC. It shows the two reference pixels for mode 66. The same figure can be obtained for mode 2, assuming that the top and left reference have been swapped, along with the height and width of the target block.

For mode 66 first, let us assume that the target pixel P has coordinate (x,y) where 0≤x<W and 0≤y<H. PDPC finds the reference pixels on refMain and refSide by extending the prediction direction. Let $P_{top}$ and $P_{left}$ denote the values of the top and left reference pixels corresponding to target pixel P. Then:

$P_{top}$=refMain[c+1];

$P_{left}$=refSide[c+1];

where c=1+x+y. If $P_{pred}$ (x,y) denotes the predicted value, the final predicted value at pixel P is obtained as $P(x,y)$=Clip (((64−wT−wL)*$P_{pred}$(x,y)+
wT*$P_{top}$wL*$P_{left}$+32)>>6), (1)

where the weights wT and wL are computed as follows:

wT=16>>min (31, ((y<<1)>>scale));

wL=16>>min (31, ((x<<1)>>scale));

with the scale pre-calculated as scale=((log 2(W)−2+log 2(H)−2+2)>>2)

For a target pixel, if the second reference sample on refSide is located beyond its length, that pixel is considered unavailable. In this case, the target pixel does not undergo the above modification and the first predicted value of the pixel remains unchanged. FIG. 3 shows the greyed pixels on the bottom-right of the target block which do not undergo PDPC.

For mode 2, the PDPC process is exactly the same as for mode 66 once the top and left reference arrays have been swapped along with the height and width of the target block.

Figure 5A:
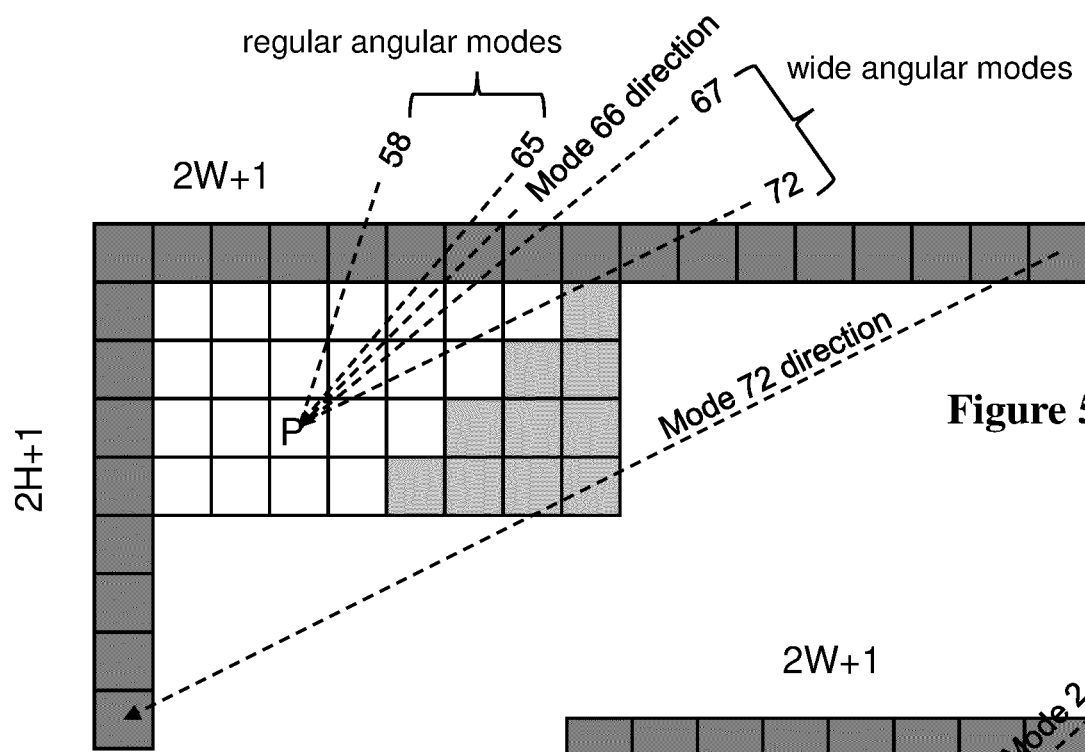
FIGS. 5A and 5B illustrate the angular modes adjacent to respectively mode 66 and mode 2.
Figure 5B:
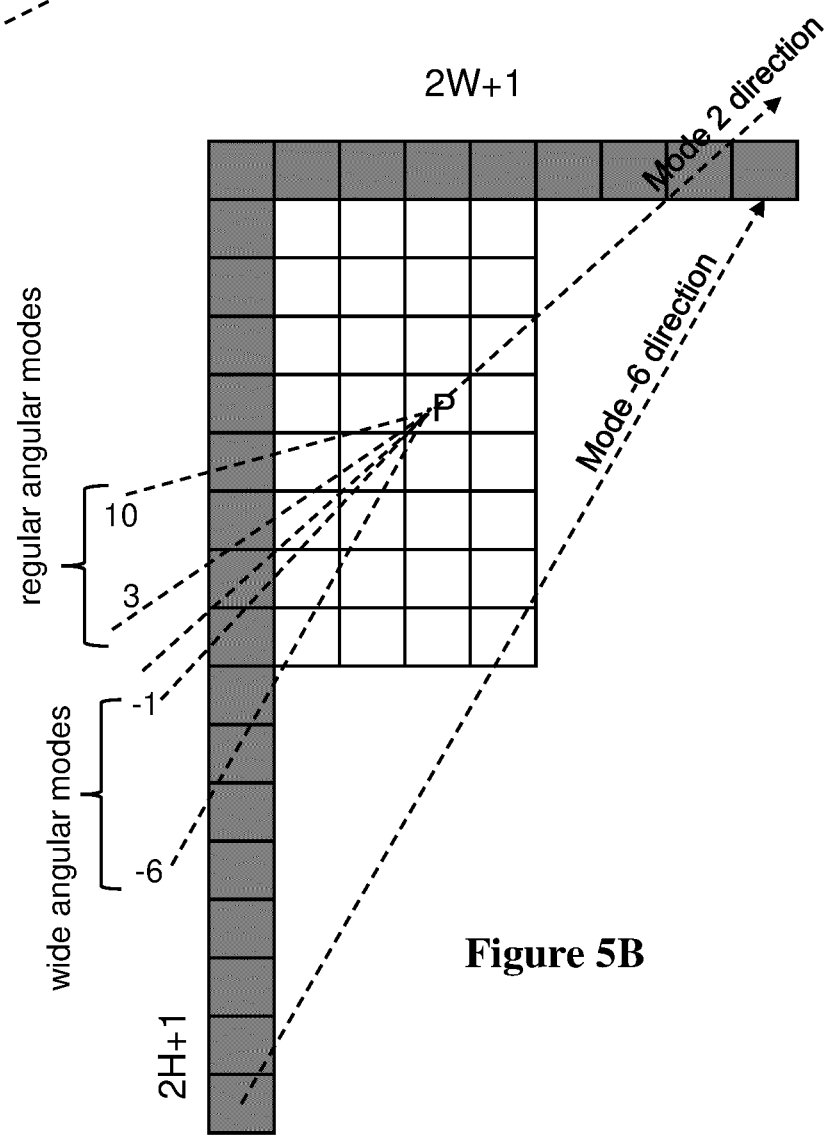

FIG. 5A illustrates the angular modes adjacent to mode 66 and FIG. 5B illustrates the angular modes adjacent to mode 2. Indeed, angular modes adjacent to modes 2 and 66 may also benefit from PDPC. In particular, 8 regular modes adjacent to each of modes 2 and 66 are considered for PDPC. Furthermore, all wide angular modes are also considered for PDPC. Thus, as illustrated in FIG. 4, for an exemplary flat rectangular block with W=2*H, modes 58 to 65 as well as the wide angular modes 67 to 72 undergo PDPC. Similarly, for an exemplary tall rectangular block with H=2*W, illustrated in FIG. 5, modes 3 to 10 as well as the wide angular modes −1 to −6 undergo PDPC. For a target block, the number of applicable wide angular modes is a function of its aspect ratio, i.e., the ratio of the width to height. In some implementations, irrespective of the shape of a target block, all its valid wide angular modes can be considered for PDPC. This is the case in the situation illustrated in FIGS. 4 and 5 where the extreme angular modes 72 and −6 respectively are valid since the required reference pixels are available. For a rectangular block with W=2H or H=2W, the number of wide angular modes is 6.

Figure 6:
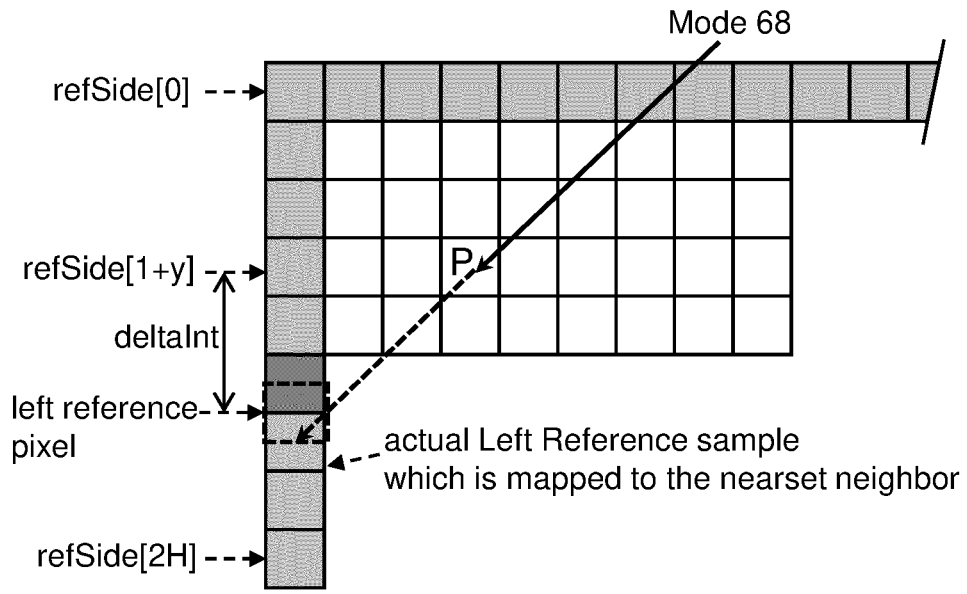
FIG. 6 illustrates an example of angular mode for PDPC for which there is a mismatch between the projection of the direction and the reference pixels.

FIG. 6 illustrates an example of angular mode for PDPC for which there is a mismatch between the projection of the direction and the reference pixels. Indeed, in this example of mode 68, the left reference pixel does not coincide with an integral sample location, so that the nearest reference pixel has to be selected. More exactly, the nearest neighbor of the intersection point is selected as the left reference pixel.

In VVC, the index of the reference pixel is computed as follows:

Let $\Delta_x$ denote the horizontal displacement of the first reference sample from the target pixel position:

$$\Delta_x = \frac{((1+y)*A)}{32}$$

where A is an angle parameter intraPredAngle, depending on the prediction mode index, which is specified by VVC as shown in Table 1 below. Positive prediction directions have positive A values, and negative prediction directions have negative A values. $\Delta_x$ can have a fractional part.

Table 1 shows a mapping of exemplary mode index to angle parameter A in VVC for vertical directions. Mapping for horizontal directions can be deduced by swapping vertical and horizontal indexes.

TABLE 1

Vertical directions

| | Mode index | | | | | | | | | | | | | | | |
|---|---|---|---|---|---|---|---|---|---|---|---|---|---|---|---|---|
| | 36 | 38 | 40 | 42 | 44 | 46 | 48 | 50 | 52 | 54 | 56 | 58 | 60 | 62 | 64 | 66 |
| A | −26 | −20 | −16 | −12 | −8 | −4 | −2 | 0 | 2 | 4 | 8 | 12 | 16 | 20 | 26 | 32 |

For deriving the left reference pixel, a similar process is applied. Let invAngle denote the inverse angle parameter corresponding to a prediction mode considered for PDPC. invAngle values are dependent on the mode parameter and can be deduced from intraPredAngle. Table 2 shows an example mapping of exemplary mode index to inverse angle parameter in VVC for vertical directions. Mapping for horizontal directions can be deduced by swapping vertical and horizontal indexes.

TABLE 2

Vertical directions

| | Mode index | | | | | | | | | | | | | | | |
|---|---|---|---|---|---|---|---|---|---|---|---|---|---|---|---|---|
| | 36 | 38 | 40 | 42 | 44 | 46 | 48 | 50 | 52 | 54 | 56 | 58 | 60 | 62 | 64 | 66 |
| invAngle | −315 | −410 | −512 | −683 | −1024 | −2048 | −4096 | 0 | 4096 | 2048 | 1024 | 683 | 512 | 410 | 315 | 256 |

Let $P_{left}$ denote the value of the left reference pixel corresponding to target pixel P at co-ordinate (x,y). $P_{left}$ is obtained as follows:

deltaPos=((1+x)invAngle+2)>>2;

deltaInt=deltaPos>>6;

deltaFrac=deltaPos & 63;

deltay=1+y+deltaInt;

$P_{left}$=refSide[deltay+(deltaFrac>>5)]

In the above, deltaPos represents the distance of $P_{left}$ from the reference pixel refSide[1+y] at a resolution of (1/64). deltaInt is the integral part of deltaPos at resolution of 1, and deltaFrac represents the remaining fractional part at resolution (1/64) (Equivalently, deltaPos=(deltaInt<<6)+deltaFrac). When deltaFrac is less than 32, $P_{left}$ is the smaller integral neighbor refSide[deltay]; And when deltaFrac is larger than, or equal to 32, $P_{left}$ is the larger integral neighbor refSide[deltay+1].

If $P_{pred}(x,y)$ denotes the initial predicted value, the final predicted value at pixel P is obtained as:

$$P(x, y)=\text{Clip}(((64-wL)*P_{pred}(x,y)+wL*P_{left}32)>>6) \quad (2)$$

where the weight wL is computed as: wL=32<<min (31, ((x<<1)>>scale)) and with the scale pre-calculated as: scale=((log 2(W)−2+log 2 (H)−2+2)>>2).

For a target pixel, if the left reference sample on refSide is located beyond its length, that pixel is considered unavailable. In this case, the target pixel does not undergo the above modification and the first predicted value of the pixel remains unchanged. In other words, no PDPC post processing is applied in this case.

For the case of horizontal prediction modes around mode 2, which undergo PDPC, the process is analogous once the top and the left reference arrays have been swapped along with the height and the width of the target block.

It is to note here that wL is a non-negative decreasing function of x. If wL=0 for x=$x_n$, then wL=0 for x>$x_n$. From Eqn (2), we observe that, if wL=0, then the left reference pixel has no effect on the weighted sum. In this case, there is no need of the PDPC operation for the considered target pixel. Because of the above property of wL, there is also no need of applying PDPC for the remaining target pixels on the same row of the block. Thus, the current PDPC tool terminates the PDPC operation in a row as soon as wL becomes 0.

Figure 7:
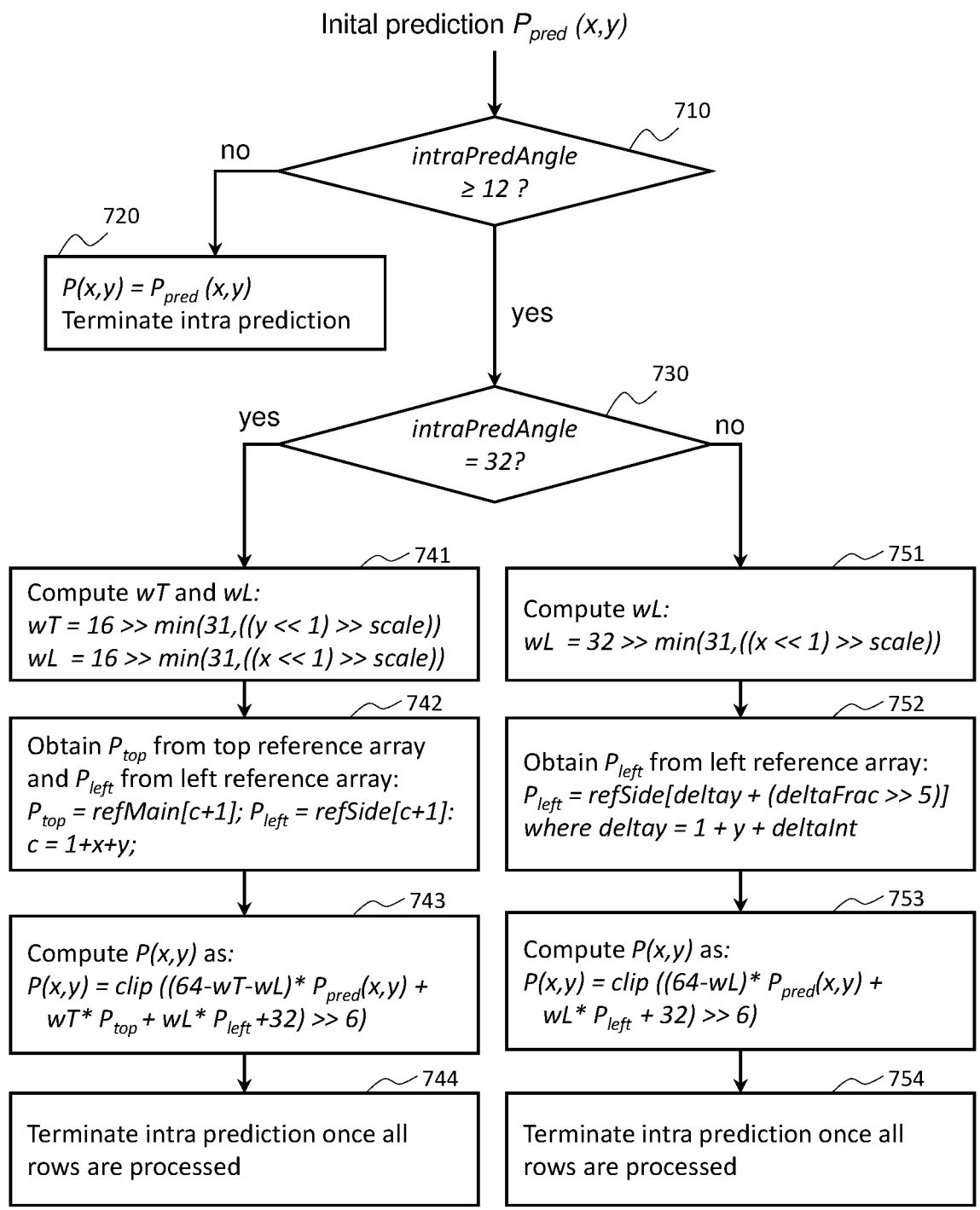
FIG. 7 illustrates an example flowchart of PDPC process for the diagonal (modes 2 and 66) and adjacent diagonal modes according to an example implementation of VTM 5.0.

FIG. 7 illustrates an example flowchart of PDPC process for the diagonal (modes 2 and 66) and adjacent diagonal modes according to an example implementation of VTM 5.0. The flowgraph does not include the PDPC for PLANAR, DC, strictly vertical, and strictly horizontal intra prediction modes. As VTM 5.0 swaps the reference arrays refMain and refSide when the mode is horizontal (i.e., when mode index<34, but not equal to 0 or 1), refMain represents the reference array on left and relSide represents the reference array on top of the current CU, when the mode index is equal to 2 or any of its adjacent modes. In these cases, therefore, the parameters wL, wT, $P_{left}$, $P_{top}$, etc., actually correspond to the parameters wT, wL, $P_{top}$, $P_{left}$, etc., respectively. The process comprises multiple tests (steps 710, 730) and multiple multiplications required in each of the computations (steps 743 and 753). In this process, first, when intraPredAngle is not greater than or equal to 12, in branch "no" of step 710, the intra prediction is terminated and no PDPC post-processing is applied. When intraPredAngle is equal to 32, in branch "yes" of step 730, then wT and wL are computed in step 741, $P_{top}$ and $P_{left}$ are obtained in step 742 and then the PDPC post processing is applied in step 743. The process iterates for the next pixel until all rows are processed, in step 744. When intraPredAngle is not equal to 32, in branch "no" of step 730, then wL is computed in step 751, $P_{left}$ is obtained in step 752 and then the PDPC post processing is applied in step 753. The process iterates for the next pixel until all rows are processed, in step 754.

Embodiments described hereafter have been designed with the foregoing in mind.

The encoder 100 of FIG. 1A, decoder 200 of FIG. 1B and system 1000 of FIG. 2 are adapted to implement at least one of the embodiments described below.

In at least one embodiment, the video coding or decoding comprises a post-processing stage for position dependent intra prediction combination where the computation is simplified to provide better computing efficiency while keeping identical compression performance.
First Simplification Referring to FIG. 3, the predicted value for any target pixel is equal to the top reference pixel for that pixel. That is, $P_{pred}$ equal to $P_{top}$. Substituting the value of $P_{top}$ in Equation (1), we get:

$P(x,y)$=Clip $(((64-wT-wL)*P_{pred}(x, y)+wT*$
$P_{pred}(x,y)+wL*P_{left}+32)>>6)$ Upon cancellation of the term $wT*P_{pred}(x,y)$, the above expression is simplified to $P(x, y)$=Clip $(((64-wL)*P_{pred}(x, y)+wL*P_{left}+32)>>6)$ (3)

where wL=16>>min(31, ((x<<1)>>scale));

This expression is identical to Equation (2) except for the value of the weights wL. As we see, there is no need to compute wT, nor the term $P_{top}$, resultingly the term $wT*P_{top}$. Because of this simplification, it is possible to merge the case of PDPC for mode 2 and mode 66 with the case of PDPC for other angular modes. In this case:

$wL = wL\max >> \min(x << 1) >> \text{scale}));$ $wL\max = 16$ if $predMode = 2$ or $predMode = 66;$ $= 32$, otherwise.

Since predMode is equal to 2 or 66 if and only if the angle parameter intraPredAngle is equal to 32, the above expression for wL can be rephrased as:

$wL = wL\max >> \min(31, ((x << 1) >> \text{scale}));$ $wL\max = 16$ if $intraPredAngle = 32;$ $= 32$, otherwise.

It is also to note that the position of the left reference sample for mode 2 or 66 does not change even if the two cases are merged. The value of invAngle for mode 2 and 66 can be equal to 256 since $$invAngle = \text{round}\left(\frac{8192}{intraPredAngle}\right) = 256).$$

Using this value, we get deltaPos=$((1+x)*256+2)>>2=(1+x)*64;$ deltaInt=deltaPos>>6=(1+x);

deltaFrac=deltaPos & 63=0;

delty=1+y+deltaInt=1+y+1+x;

$P_{left}$=refSide[1+y+1+x]=refSide[c+1] where c=1+x+y;

As we see, this is the same value as computed in the case of mode 2 and 66 as previously. Thus, the above merging will result in identical results as the conventional implementation but based on an equation that requires less operations to be performed and thus more efficient regarding the computation requirements.

As a matter of fact, the term deltaFrac really does not serve any purpose. In the initial PDPC proposal, deltaFrac was included as the position of the left reference sample was linearly interpolated based on deltaFrac's value. In a further proposal, the linear interpolation was replaced by the nearest neighbor. However, for this, the computation of the deltaFrac term is quite redundant, as we show in the next embodiment.
Second Simplification The delty term, as computed above, results in the smaller value of the adjacent integer pair between which the left reference sample may occupy. The value of the deltaFrac decides the mapping of left reference pixel to either refSide[delty] or refSide[delty+1] depending on if deltaFrac<32, or if deltaFrac>=32, respectively. This process has a repercussion on the check for the availability of the left reference pixel. As it has been mentioned earlier, PDPC is not applied to those target pixels for which the left reference pixel is located beyond the length of the left reference array. In this case, it is considered that the left reference pixel is not available, and the initial predicted value is not modified.

Figure 8:
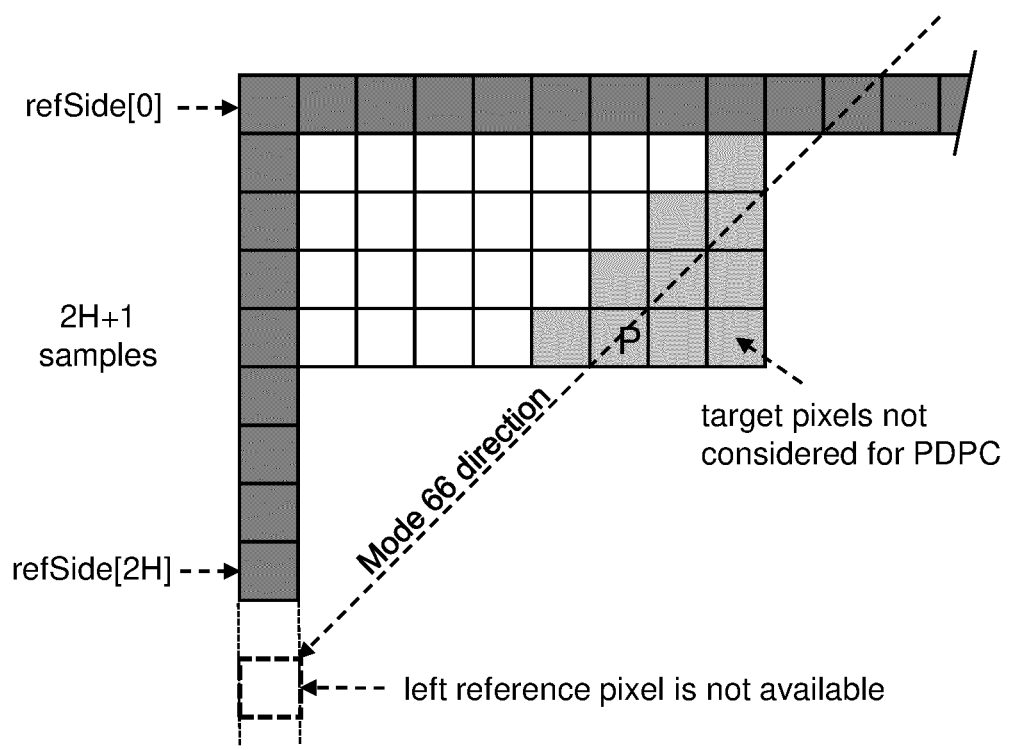
FIG. 8 illustrates an example of PDPC for the vertical diagonal mode 66 for which the target pixels for the left reference samples are not available.

FIG. 8 illustrates an example of PDPC for the vertical diagonal mode 66 for which the target pixels for the left reference samples are not available.

Recalling that the length of the left reference array refSide is 2H+1 with the first sample at index 0 (refSide [0]), and the last sample at index 2H (refSide [2H]), with PDPC, delty is checked if delty>(2*H−1) to decide if the left sample is not available. This formulation enables the left pixel to be interpolated (if deltaFrac is non-null). To interpolate, the pair refSide[delty] and refSide[delty+1] are needed. Here, since nearest neighbor is used instead of interpolation, the tool then decides on one pixel of the pair depending on the deltaFrac's value. However, in the case of PDPC for mode 2 and mode 66, as the left reference sample is located at an integral location (refSide[c+1]=refSide[2+x+y]), the tool checks for c>=2*H, to decide if the left reference sample is not available. This introduces some ambiguity.

As we saw earlier, the derivation of the left reference sample involves computing the distance deltaPos: deltaPos= $((1+x)$invAngle+2$)>>2;$ The term on the right-hand side is nothing but a recursive sum. Thus, deltaPos can be computed as follows, to remove the multiplication by x:

invAngleSum[−1]=2;

For 0<=x<W invAngleSum[x]=invAngleSum[x−1]+invAngle;

deltaPos=invAngleSum[x]>>2;

deltaInt=deltaPos>>6;

deltaFrac=deltaPos & 63;

delty=1+y+deltaInt;

$P_{left}$=refSide[delty+(deltaFrac>>5)]

In at least one embodiment, we propose to modify the process as follows invAngleSum[−1]=128;

for 0<=x<W invAngleSum[x]=invAngleSum[x−1] +invAngle;

deltay=1+y+(invAngleSum[x]>>8), $P_{left}$=refSide[deltay]

Notice that in the above simplification, we have merged the following three steps into one:

deltaPos=invAngleSum[x]>>2;

deltaInt=deltaPos>>6;

deltay=1+y+*deltaInt*;

We have initialized invAngleSum with 128 instead of 2 so that the bit-shifting operation (invAngleSum>>8) results in the nearest integer because of the rounding. This avoids calculating the parameter deltaFrac. As a consequence, we just need to check if deltay>2*H to know if the left reference pixel is not available. This is identical to the check when PDPC is applied for mode 2 or mode 66.

A secondary effect of this simplification is the better use of the last reference pixel in refSide, that is, refSide[2H]. If the actual position of the reference sample is between 2H and 2H+1, and is closer to refSide[2H], the above process will map the position to 2H and will use the pixel refSide [2H] as $P_{left}$. In conventional PDPC implementation, this case may be simply skipped as deltay>2H, and consequently the initial predicted value of the current pixel will remain unchanged. Except for this special case, the proposed simplification will result in identical predicted values for target pixels as the VTM 5.0.

Equation (3) can thus be simplified with the observation that the weighted sum does not require a clipping:

$P(x,y)=((64+wL)*P_{pred}(x, y)+wL*P_{left}+32)>>6$ for $0 \leq x \leq W$, $0 \leq y < H$;

This equation can be further simplified as $$P(x, y) = (64 * P_{pred}(x, y) - wL * P_{pred}(x, y) + wL * P_{left} + 32) \gg 6 =$$
$$P_{pred}(x, y) + ((wL * (P_{left} - P_{pred}(x, y)) + 32) \gg 6).$$

This simplification avoids the multiplication by (64−wL), which need not be a power of 2. As we have seen, wL has only non-negative values. If wL>0, it is also a power of 2. Thus, the sole multiplication in the above equation can be performed with a bit-shift as illustrated in equation (4).

In at least one embodiment, the video coding or decoding comprises a post-processing stage using PDPC where the prediction computation uses the following equation (4):

$P(x,y)=P_{pred}(x, y)+((((P_{left}-P_{pred}(x, y))<<\log 2(wL))+32)>>6)$ (4)

The person skilled in the art will notice that the above simplification proposal corresponds to the VTM 5.0 code with an iteration loop and the initialization of invAngleSum outside the loop to avoid multiplication. The same can be equivalently written as follows:

for 0<=x<W deltay=1+y+(((1+x)*invAngle+128)>>8)

$P_{left}$=refSide[deltay]

Note that refSide reference array has its 0th coordinate at the top-left pixel i.e., at coordinate (−1,−1) of the reconstructed samples. If it is initialized at coordinate (−1,0) otherwise, the above equations will be modified as:

for 0<=x<W deltay=y+(((1+x)*invAngle+128)>>8)

$P_{left}$=refSide[deltay]

Thus, with the above coordinate adjustment, the proposed PDPC simplification for vertical mode 66 and the adjacent modes of mode 66 is as follows:

for 0<=x<W deltay=y+(((1+x)*invAngle+128)>>8)

$P_{left}$=refSide[deltay]

$P(x, y)=P_{pred}(x, y)+((wL*(P_{left}-P_{pred}(x, y)+32)>>6)$ wL=wLmax>>min (31, ((x<<1)>>scale))

wLmax=16 if mode=66, else wLmax=32

Similarly, for horizontal prediction mode 2 and adjacent modes to mode 2, the proposed PDPC modification is as follows:

for 0<=y<H deltax=x+(((1+y)*invAngle+128)>>8)

$P_{top}$=refMain[deltax]

$P(x, y)=P_{pred}(x, y)+((wT*(P_{top}-P_{pred}(x, y))+32)>>6)$ wT=wTmax>>min (31, ((y<<1)>>scale))

wTmax=16 if mode=2, else wTmax=32 where, refMain denotes the reference array on top of the target block, and $P_{top}$ denotes the reference pixel on it obtained by intersection with the extension of the prediction direction.

Figure 9:
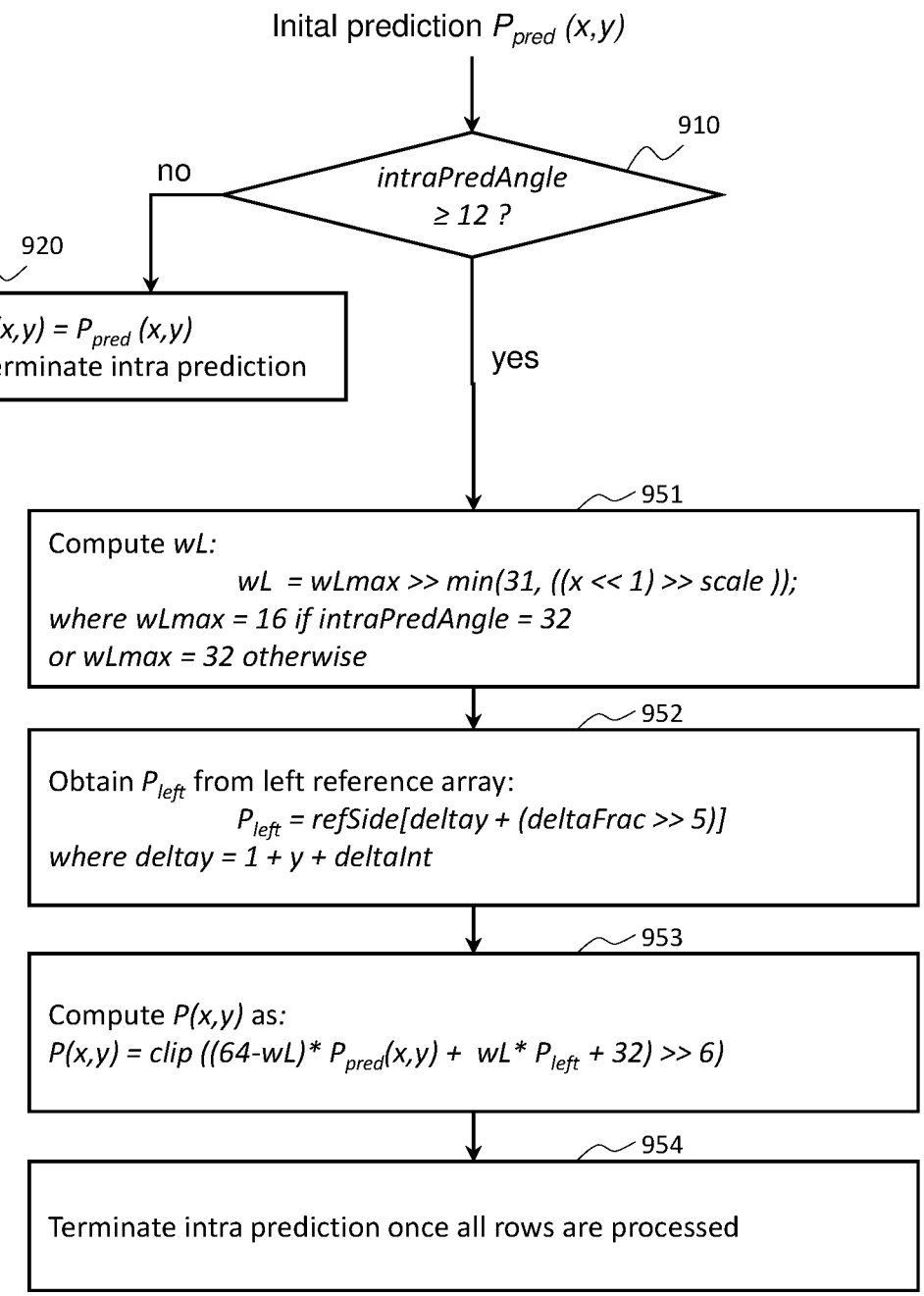
FIG. 9 illustrates an example flowchart according to a first embodiment of modified PDPC process.

FIG. 9 illustrates an example flowchart according to a first embodiment of modified PDPC process, following an example implementation based on VTM 5.0. In this modified process, the video coding or decoding comprises a post-processing stage using PDPC in angular mode where the two different prediction computations are merged and at least one pixel of a block of picture is reconstructed according to its prediction value and a reference value in an adjacent block weighted according to an angular direction as illustrated in and described above as the first simplification. As in the right branch of FIG. 7, refSide represents the reference array on top of the current CU when the prediction mode is horizontal. Therefore, when the mode index is equal to 2 or any of its adjacent modes, the parameters wL, wLMax, $P_{left}$, etc., actually correspond to the parameters wT, wTMax, $P_{top}$, etc., respectively.

In this embodiment, the post-processing comprises, when the angle parameter intraPredAngle is greater than 12 (thus corresponding to a mode index greater than or equal to 58 or smaller than or equal to 10, as shown in table 1 and FIGS. 3A and 3B), in branch "yes" of step 910, for a pixel, computing in step 951 a weighting value wL, obtaining in step 952 a left reference pixel by extending the prediction direction to the left reference array and computing a post-processed value in step 953 for the predicted pixel according to equation (3):

$P(x, y)=\text{Clip}(((64-wL)*P_{pred}(x, y)+wL*P_{left}+32)>>6)$ (3)

In other words, a predicted pixel is modified based on a weighting between its predicted value and a reference pixel selected from the column at the left of the block based on an angle of an angular prediction mode.

Note that the test done at step 201 could be done on the mode index value instead of intraPredAngle value, but in this case two or more comparisons would be necessary to check if the prediction angle is within a range of values, where a range can correspond to either a set of vertical modes or a set of horizontal modes. Although in this embodiment, the intraPredAngle is tested with regards to a fixed value of 12, corresponding to mode indices of 10 and 58, other values of comparison can be used and be compatible with the principle of this first embodiment. For example, in another embodiment, the intraPredAngle is tested with regards to a fixed value of 0, corresponding to mode indices of 18 and 50. In another embodiment, the intraPredAngle is tested with regards to a fixed value in the range of 0 to 12 corresponding to mode indices between 10 and 18 and between 50 and 58.

Figure 10:
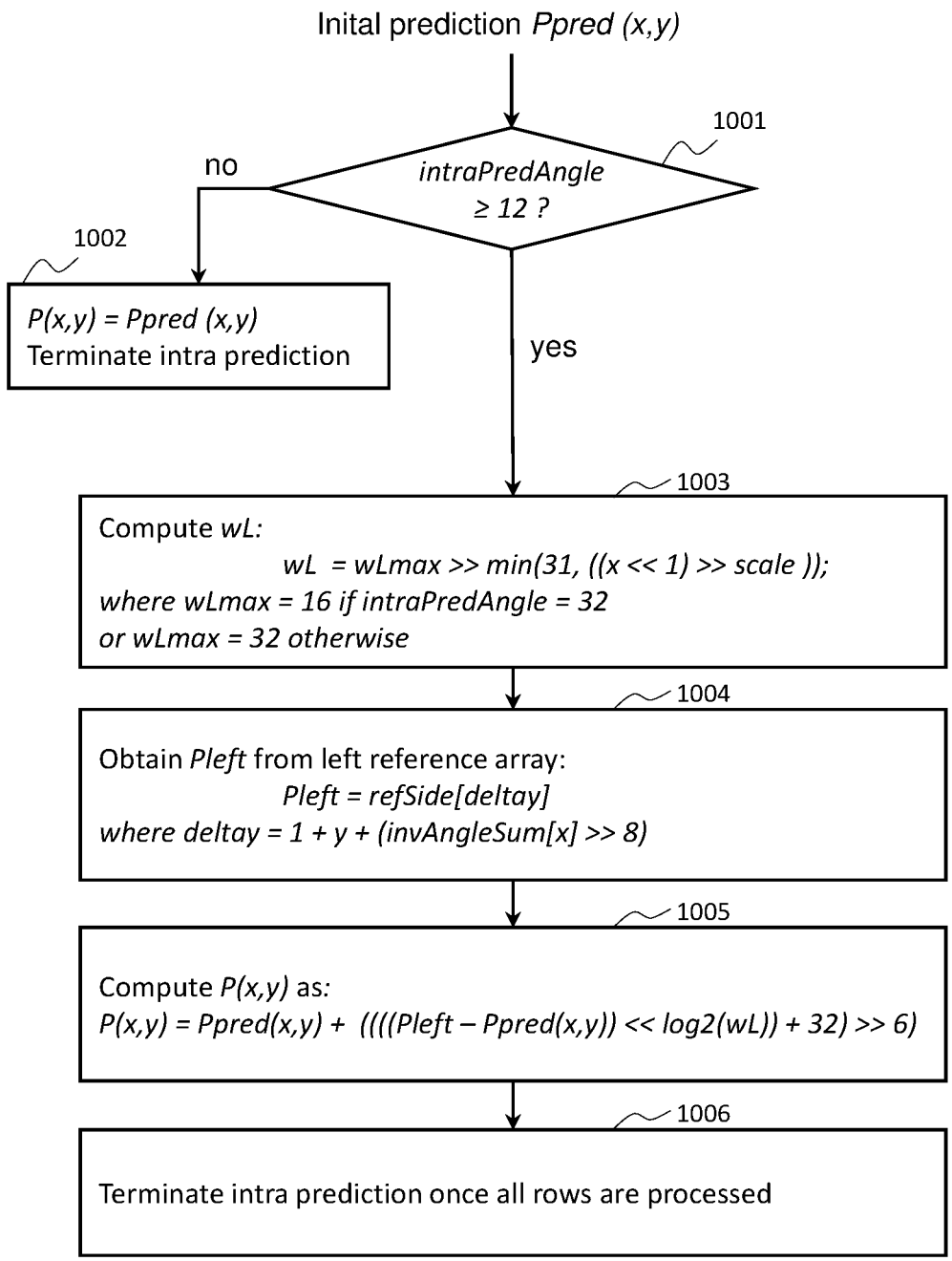
FIG. 10 illustrates an example flowchart according to a second embodiment of modified PDPC process.

FIG. 10 illustrates an example flowchart according to a second embodiment of modified PDPC process, following an example implementation based on VTM 5.0. In this second embodiment, the video coding or decoding comprises a post-processing stage using PDPC in angular mode where the two different prediction computations are merged and at least one pixel of a block of picture is reconstructed according to its prediction value and a reference value in an adjacent block weighted according to an angular direction as illustrated in FIG. 9 and described above as the second simplification. As in FIG. 9, refSide represents the reference array on top of the current CU when the prediction mode is horizontal. Therefore, when the mode index is equal to 2 or any of its adjacent modes, the parameters wL, wLMax, $P_{left}$, etc., actually correspond to the parameters wT, wTMax, $P_{top}$, etc., respectively.

In this embodiment, the post-processing comprises, when the angle parameter intraPredAngle is greater than a predetermined value (for example 12), for a pixel, computing in step 1003 a weighting value wL, obtaining in step 1004 a left reference pixel by extending the prediction direction to the left reference array and computing in step 1005 a post-processed value for the predicted pixel according to equation (4):

$$P(x, y)=P_{pred}(x, y)+((((P_{left}-P_{pred}(x, y))<<\log 2(wL))+32)>>6) \quad (4)$$

In other words, a predicted pixel is modified based on a weighting between its predicted value and a reference pixel selected from the column at the left of the block comprising the pixel based on an angle of an angular prediction mode.

Whereas the conventional PDPC uses multiple checks and several multiplications, the second embodiment uses only a single check and shift, addition and subtraction operations that are much more efficient than the multiplication operation in terms of computing requirements.

Although in this embodiment, the intraPredAngle is tested with regards to a fixed value of 12, other values of comparison can be used and be compatible with the principle of this first embodiment.

Third Embodiment

A third embodiment is based on either the first or second embodiment wherein the left reference sample, for a target pixel at (x, y) is always refSide[c+1] where c=1+x+y, irrespective of the value of the intraPredAngle.

Fourth Embodiment

A fourth embodiment is based on one of the embodiments described above wherein the left reference sample's position lies beyond the length of refSide, we use the last reference sample refSide[2H] instead of terminating the PDPC at the current target pixel on a row.

Fifth Embodiment

A fifth embodiment is based on one of the embodiments described above wherein all positive vertical and horizontal directions as eligible modes for PDPC besides the four fixed modes of PLANAR (mode 0), DC (mode 1), strictly vertical (mode 50) and strictly horizontal (mode 18).

Sixth Embodiment

A sixth embodiment is based on one of the embodiments described above wherein any other non-negative and decreasing function for deriving the weights wL is used. As an example, the weights can be derived based on the prediction direction as:

$$wL=wL\max>>((x<<1)>>\text{scale});$$

$$wL\max=16*((\text{intraPredAngle}+32)>>5).$$

Seventh Embodiment

A seventh embodiment is based on one of the embodiments described above wherein the RD performance with and without PDPC for the eligible modes is checked. The use of PDPC is signaled to the decoder as a one-bit PDPC flag at the CU level. The flag can be context-encoded where the context can be a fixed value, or can be deduced from the neighborhood, prediction direction, etc.

Eighth Embodiment

An eighth embodiment is based on one of the embodiments described above wherein PDPC is performed for all CUs in a slice and the application of such PDPC is signalled to the decoder using a one bit flag in the slice header.

Ninth Embodiment

A ninth embodiment is based on one of the embodiments described above wherein PDPC is performed for all CUs in a slice and the application of such PDPC is signalled to the decoder using a one bit flag in the Picture Parameter Set (PPS) header.

Tenth Embodiment

A tenth embodiment is based on one of the embodiments described above wherein PDPC is performed any frame of a sequence and the application of such PDPC is signalled to the decoder using a one bit flag in the Sequence Parameter Set (SPS) header.

Results

Experiments have been performed with the VTM 5.0 codec in All-INTRA (AI) configuration with all required test conditions.

FIG. 11 illustrates the result of an implementation of the first embodiment and FIG. 12 illustrates the result of an implementation of the second embodiment. These figures show the BD-rate performances of the proposed simplifications compared to that of the VTM 5.0 anchor. In these tables, the lines represent different classes of content to be encoded or decoded corresponding to sample of original video content. The first column lists these classes. The column 2, 3, and 4 respectively named Y, U, V show the difference in term of size between the VTM 5.0 codec and the proposed embodiment for respectively the Y, U, V components of the original video. Thus, these columns show the difference of compression efficiency compared to VTM 5.0. The columns 5 and 6 respectively named EncT and DecT show the difference of respectively encoding and decoding time with regards to the VTM 5.0 encoding and decoding times. Comparing the time required for the encoding and decoding is representative of the compression efficiency of the proposed embodiment compared to the VTM 5.0 implementation. FIG. 11 shows overall improvements regarding the encoding and decoding time. FIG. 12 shows overall improvements regarding the encoding and decoding time as well as encoding size.

Figure 13:
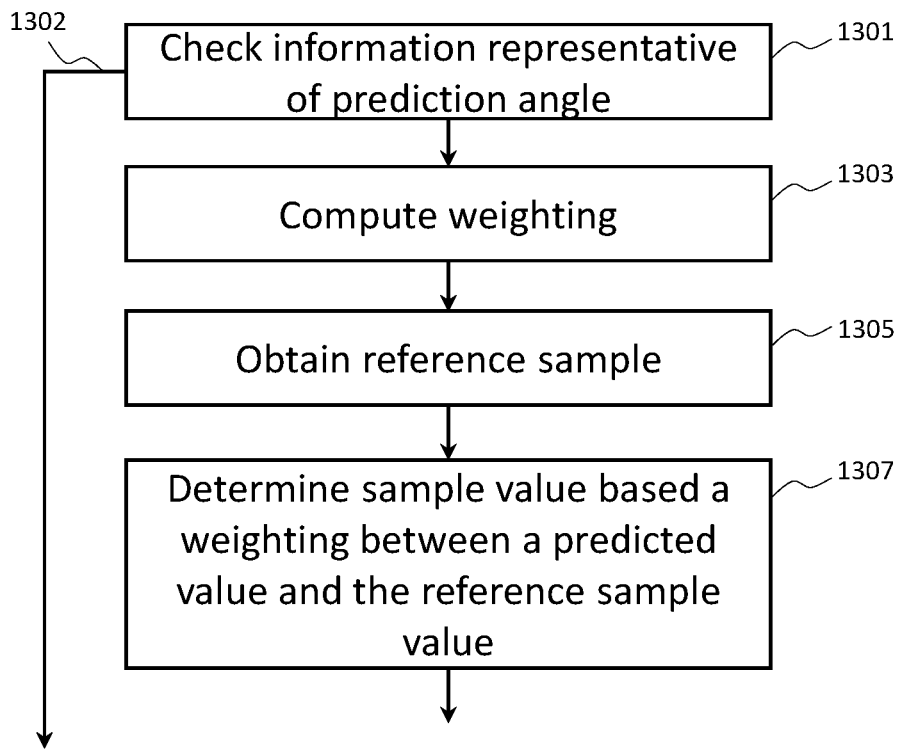
FIG. 13 illustrates an example flowchart according to various embodiments described in the disclosure.

FIG. 13 illustrates an example flowchart according to various embodiments described in the disclosure. This flowchart is activated when a PDPC post-processing may take place and iterates on samples of a block of samples. First, in step 1301, an information representative of a prediction angle is tested and it is determined if it matches a criteria. This angle corresponds to the angle that was used to perform the intra prediction and thus to generate a current sample. This test can be done based on an angular value, to an intra prediction mode, to the value of an intraPredAngle parameters or any value representative of the prediction angle. When the angle is not correct, no PDPC post-processing will be performed and the predicted sample will not be modified, in branch 1302.

In at least one embodiment, the angle is considered as being correct when the intraPredAngle parameter is greater than or equal to 12. In a variant embodiment, the angle is considered as being correct when the intra prediction mode is in the range of −6 to 10 or 58 to 72. The person skilled in the art will notice that these two different matching criteria correspond to an identical range of angle of the angular intra prediction.

When the angle is considered as being correct, a weighting is computed in step 1303. This weighting will allow to balance the amount of correction and thus the value of the resulting sample between the predicted value of the sample and a reference sample.

In step 1305, a reference sample is obtained. In at least one embodiment, the reference sample is obtained from a left reference array that comprises the values of the samples of the column at the left of the block by extending the angular intra prediction direction to the column at the left of the block and selecting from the left reference array the sample that is closest to the intersection between the angular intra prediction direction and the column at the left of the block. An index to this array can be computed in a simple manner as mentioned earlier under the name deltay.

In step 1307, the sample value is determined according to obtained and computed parameters. Equations 3 and 4 described above provide different formulas to compute the sample value. These equations, and more particularly equation 4, have at least the advantage of requiring less computation than conventional techniques. One reason for that is that no reference sample from the top reference array is taken into account, since is was already taken into account to determine the prediction value for the sample. At least another reason is that the fractional part is no more taken into account, thus allowing for further computation simplification. Another reason is that one additional angle testing is dismissed. The determination of the sample value according to step 1307 can also be understood as a correction, modification, or post-processing of the previously predicted sample.

The operations of step 1301 can be executed once for each block. However, operations of steps 1303 to 1307 FIG. 13 need to be executed on each sample of the block since the parameters involved depend on the position and/or the value of the sample. Once all samples of the block have been processed, then the block may be processed, for example encoded.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

The aspects described and contemplated in this application can be implemented in many different forms. FIGS. 1A, 1B and 2 provide some embodiments, but other embodiments are contemplated, and the discussion of these figures does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the motion compensation and motion estimation modules (170, 175, 275), of a video encoder 100 and decoder 200 as shown in FIG. 1A and FIG. 1B. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, tablets, smartphones, cell phones, portable/personal digital assistants, and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

In the present application, the terms "reconstructed" and "decoded" may be used interchangeably, the terms "pixel" and "sample" may be used interchangeably, the terms "image," "picture", "frame", "slice" and "tiles" may be used interchangeably. Usually, but not necessarily, the term "reconstructed" is used at the encoder side while "decoded" is used at the decoder side.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of an illumination compensation parameter. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

In a first variant of the first aspect, the angle criteria is considered to match when the intra prediction angle is smaller than or equal to a first value or greater than or equal to a second value, the first value being smaller than the second value. In a variant if the first variant, the first value is 10 and the second value is 58.

In a second variant of the first aspect, the angle criteria is considered to match when an intraPredAngle value representative of the intra prediction angle is greater than or equal to a value. In a variant if the first variant, the angle criteria is considered to match when an intraPredAngle value representative of the intra prediction angle is greater than or equal to 12.

In a further variant of first aspect, for a vertical angular direction, the left reference sample is determined from a left reference array that comprises the values of the samples of the column at the left of the block, the left reference sample being determined by extending the vertical angular intra prediction direction to the column at the left of the block and selecting from the left reference array the sample that is closest to the intersection between the vertical angular intra prediction direction and the column at the left of the block, and for a horizontal angular direction, the top reference sample is determined from a top reference array that comprises the values of the samples of the row at the top of the block, the top reference sample being determined by extending the horizontal angular intra prediction direction to the row at the top of the block and selecting from the top reference array the sample that is closest to the intersection between the horizontal angular intra prediction direction and the row at the top of the block In a further variant of first aspect, the value of the sample $P(x,y)$ is determined according to $P(x,y)=P_{pred}(x,y)+((((P_{left}-P_{pred}(x,y))<<\log 2(wL))+32)>>6)$ for a vertical direction and according to $P(x,y)=P_{pred}(x,y)+((((P_{top}-P_{pred}(x,y))<<\log 2(wT))+32)>>6)$ for a horizontal direction, where $P_{pred}(x,y)$ is the obtained predicted value for the sample, $P_{left}$ or $P_{top}$ is the value of the left or top reference sample and wL or wT is the weighting.

In a further variant of first aspect, for a vertical angular direction, the value of the left reference sample $P_{left}$ is determined by: $P_{left}$=refSide[deltay] where refSide is an array of the values of samples of a column at the left of the block, deltay=y+(((1+x)*invAngle+128)>>8), and for a horizontal angular direction, the value of the top reference sample $P_{top}$ is determined by: $P_{top}$=refMain[deltax] where refMain is an array of the values of samples of a row at the top of the block, deltax=x+(((1+y)*invAngle+128)>>8), where invAngle is the inverse of the angle parameter corresponding to the prediction angle.

In a further variant of first aspect, the weighting is determined according to: wL=wLmax>>min(31, ((x<<1)>>scale)) where wLmax=16 when intraPredAngle is equal to 32 or wLmax=32 otherwise, wT=wTmax>>min(31, ((y<<1)>>scale)) where wTmax=16 when intraPredAngle is equal to 32 or wTmax=32 otherwise, and scale is equal to ((log 2(W)−2+log 2(H)−2+2)>>2).

The invention claimed is:

1. A method comprising:
obtaining a predicted value Ppred(x,y) for a sample of a block of an image, the predicted value being intra predicted according to a value representative of an intra prediction angle, wherein the intra prediction angle is a diagonal top right to bottom left direction corresponding to a first prediction mode or a diagonal bottom left to top right direction corresponding to a second prediction mode; and
determining a sample value P(x,y), such that:
for the first prediction mode: P(x,y)=Ppred(x,y)+((((Pleft−Ppred(x,y))<<log 2(wL))+32)>>6), and
for the second prediction mode: P(x,y)=Ppred(x,y)+((((Ptop−Ppred(x,y))<<log 2(wT))+32)>>6),
where, Pleft is determined based on a value of a left reference sample, Ptop is determined based on the value of a top reference sample, and wL and wT are weightings.

2. The method of claim 1, wherein:
for a vertical angular direction associated with the first prediction mode, the left reference sample is determined from a left reference array that comprises the values of the samples of the column at the left of the block, the left reference sample being determined by extending the vertical angular intra prediction direction to the column at the left of the block and selecting from the left reference array the sample that is closest to the intersection between the vertical angular intra prediction direction and the column at the left of the block, and
for a horizontal angular direction associated with the first prediction mode, the top reference sample is determined from a top reference array that comprises the values of the samples of the row at the top of the block, the top reference sample being determined by extending the horizontal angular intra prediction direction to the row at the top of the block and selecting from the top reference array the sample that is closest to the intersection between the horizontal angular intra prediction direction and the row at the top of the block.

3. The method of claim 1 wherein,
for the first prediction mode, the value of the left reference sample Pleft is determined by:
Pleft=refSide[deltay], where refSide is an array of the values of samples of a column at the left of the block, deltay=y+(((1+x)*invAngle+128)>>8), and
for the second mode, the value of the top reference sample Ptop is determined by:
Ptop=refMain[deltax], where refMain is an array of the values of samples of a row at the top of the block, deltax=x+(((1+y)*invAngle+128)>>8),
where invAngle is the inverse of the angle parameter corresponding to the prediction angle.

4. The method of claim 1, wherein the weighting is determined such that:
for the first prediction mode:
wL=wLmax>>min(31, ((x<<1)>>scale)), where wLmax=16, and
for the second prediction mode:
wT=wTmax>>min(31, ((y<<1)>>scale)), where wTmax=16,
where scale is equal to ((log 2(W)−2+log 2(H)−2+2)>>2).

5. The method of claim 1, wherein the first prediction mode corresponds to mode 66 as referenced in the versatile video coding specification, and the second prediction mode corresponds to mode 2 as referenced in the versatile video coding specification.

6. A method for encoding a block a video, the method comprising:
for each sample of the block of the video:
performing intra prediction for the sample;
modifying the value of the sample according to the method of claim 1; and
encoding the block.

7. An apparatus comprising an encoder, the encoder being configured to, for a block of a video:
for each sample of the block of the video:
perform intra prediction for the sample;
modify the value of the sample according to the method of claim 1; and
encode the block.

8. A non-transitory computer readable medium comprising program code instruction for implementing the steps of a method according to claim 1 when executed by a processor.

9. A method for decoding a block a video, the method comprising:
for each sample of the block of the video:
performing intra prediction for the sample;
modifying the value of the sample by:
obtaining a predicted value Ppred(x,y) for a sample of a block of an image, the predicted value being intra predicted according to a value representative of an intra prediction angle, wherein the intra prediction angle is a diagonal top right to bottom left direction corresponding to a second prediction mode or a diagonal bottom left to top right direction corresponding to a second prediction mode; and
determining a sample value P(x,y), such that:
for the first prediction mode: P(x,y)=Ppred(x,y)+ ((((Pleft−Ppred(x,y)) <<log2(wL))+32)>>6, and
for the second prediction mode: P(x,y)=Ppred(x,y)+ ((((Ptop−Ppred(x,y))<<log2(wT))+32)>>6),
where, Pleft is determined based on the value of a left reference sample, Ptop is determined based on the value of a top reference sample, and wL and wT are weightings; and
decoding the block.

10. An apparatus comprising a decoder, the decoder being configured to, for a block of a video:
for each sample of the block of the video:
perform intra prediction for the sample;
modify the value of the sample by:
obtaining a predicted value Ppred(x,y) for a sample of a block of an image, the predicted value being intra predicted according to a vlaue representative of an intra prediction angle, wherein the intra prediction angle is a diagonal top right to bottom left direction corresponding to a first prediction mode or a diagonal bottom left to top right direction corresponding to a second prediction mode; and
determining a sample value P(x,y), such that:
for the first prediction mode: (P(x,y)=Ppred(x,y)+ ((((Pleft−Ppred(x,y)) <<log2(wL))+32)>>6), and
for the second predicction mode: (P(x,y)=Ppred (x,y)+((((Ptop−Pped(x,y))<<log2(wT))+32) >>6),
where, Pleft is determined based on the value of a left reference sample, Ptop is determined based on the value of a top reference sample, and wL and wT are weightings; and
decode the block.

11. The apparatus of claim 10, wherein:
for a vertical angular direction associated with the first prediction mode, the left reference sample is determined from a left reference array that comprises the values of the samples of the column at the left of the block, the left reference sample being determined by extending the vertical angular intra prediction direction to the column at the left of the block and selecting from the left reference array the sample that is closest to the intersection between the vertical angular intra prediction direction and the column at the left of the block, and
for a horizontal angular direction associated with the second prediction mode, the top reference sample is determined from a top reference array that comprises the values of the samples of the row at the top of the block, the top reference sample being determined by extending the horizontal angular intra prediction direction to the row at the top of the block and selecting from the top reference array the sample that is closest to the intersection between the horizontal angular intra prediction direction and the row at the top of the block.

12. The apparatus of claim 10 wherein,
for the first prediction mode, the value of the left reference sample Pleft is determined by:
Pleft=refSide[deltay], where refSide is an array of the values of samples of a column at the left of the block, deltay=y+(((1+x)* invAngle+128)>>8), and for the second mode, the value of the top reference sample Ptop is determined by:
Ptop=refMain[deltax], where refMain is an array of the values of samples of a row at the top of the block, deltax=x+(((1+y)* invAngle+128)>>8), where invAngle is the inverse of the angle parameter corresponding to the prediction angle.

13. The apparatus of claim 10, wherein the weighting is determined such that:
for the first prediction mode:
wL=wLmax>>min(31, ((x<<1)>>scale)), where wLmax=16, and for the second prediction mode:
wT=wTmax>>min(31, ((y<<1)>>scale)), where wTmax=16,
where scale is equal to ((log2(W)−2+log2(H)−2+2)>>2).

14. The apparatus of claim 10, wherein the first prediction mode corresponds to mode 66 as referenced in the versatile video coding specification, and the second prediction mode corresponds to mode 2 as referenced in the versatile video coding specification.

\* \* \* \* \*

UNITED STATES PATENT AND TRADEMARK OFFICE
CERTIFICATE OF CORRECTION

| | | |
|---|---|---|
| PATENT NO. | : 11,991,361 B2 | Page 1 of 1 |
| APPLICATION NO. | : 17/619047 | |
| DATED | : May 21, 2024 | |
| INVENTOR(S) | : Rath et al. | |

It is certified that error appears in the above-identified patent and that said Letters Patent is hereby corrected as shown below:

In the Claims

Column 25, Line 13, in Claim 2: Replace "first" with -- second --

Column 26, Line 11, in Claim 9: Replace "second" with -- first --

Column 26, Line 33, in Claim 10: Replace "vlaue" with -- value --

Signed and Sealed this
Twenty-second Day of October, 2024

Katherine Kelly Vidal
*Director of the United States Patent and Trademark Office*